United States Patent
Thörn

(10) Patent No.: US 8,022,982 B2
(45) Date of Patent: Sep. 20, 2011

(54) CAMERA SYSTEM AND METHOD FOR OPERATING A CAMERA SYSTEM

(75) Inventor: Karl Ola Thörn, Malmo (SE)

(73) Assignee: Sony Ericsson Mobile Communications AB, Lund (SE)

( * ) Notice: Subject to any disclaimer, the term of this patent is extended or adjusted under 35 U.S.C. 154(b) by 767 days.

(21) Appl. No.: 11/968,215

(22) Filed: Jan. 2, 2008

(65) Prior Publication Data

US 2009/0167881 A1 Jul. 2, 2009

(51) Int. Cl.
*H04N 7/18* (2006.01)
(52) U.S. Cl. ........................... 348/78; 348/222.1
(58) Field of Classification Search ............ 348/78
See application file for complete search history.

(56) References Cited

U.S. PATENT DOCUMENTS

| | | | | |
|---|---|---|---|---|
| 4,299,464 | A * | 11/1981 | Cushman | 396/157 |
| 7,659,923 | B1 * | 2/2010 | Johnson | 348/218.1 |
| 2001/0028309 | A1 | 10/2001 | Torch | |
| 2005/0024516 | A1 | 2/2005 | Fish et al. | |
| 2007/0171276 | A1 * | 7/2007 | Kim et al. | 348/51 |
| 2007/0201724 | A1 * | 8/2007 | Steinberg et al. | 382/103 |

FOREIGN PATENT DOCUMENTS

| | | |
|---|---|---|
| EP | 1471455 | 10/2004 |
| EP | 1628465 | 2/2006 |

OTHER PUBLICATIONS

Patrick Reignier, "Finding a face by blink detection", ECVNet, http://www-prima.imag.fr/ECVNet/IRS95/nodel3.html, 1995.
Piers Barnes, "Blink-free Photos, Guaranteed", http://209.85.135.104/search?q=cache:BxEkSDJgX2AJ:www.control.com.au/bi2006/277velocity.
pdf+australasian+science+august+2006+blink+nic+svenson&hl=sv& ct=clnk&cd=1&gl=se&lr=lang_en, Aug. 2006.
International Search Report and Written Opinion from corresponding International Application No. PCT/IB08/001737.

* cited by examiner

*Primary Examiner* — Anthony J Daniels
(74) *Attorney, Agent, or Firm* — Renner, Otto, Boisselle & Sklar, LLP

(57) ABSTRACT

A system and method for controlling a camera assembly may include monitoring an image field for blinks by one or more subjects in the image field. The monitoring may be carried out by generating a video signal of the image field, the video signal having a sequence of frames; subtracting a previous frame of the video signal from a current frame of the video signal to generate a difference frame; and identifying image data in the difference frame that is representative of a blink. Each blink may be tracked and associated with a subject from the one or more subjects. Statistical data regarding blink duration and blink rate for each subject from the one or more subjects may be generated. In response to user input to command the taking of a photograph, a determination if a blink is in progress may be made and a flash of the camera assembly may be fired and image data for the photograph may be captured if no blink is detected at the time of the command. Otherwise, firing of the flash and the capturing of the image data may be delayed by an amount of time that is based on the statistical data to minimize firing the flash and capturing the image data during a blink of the one or more subjects.

17 Claims, 4 Drawing Sheets

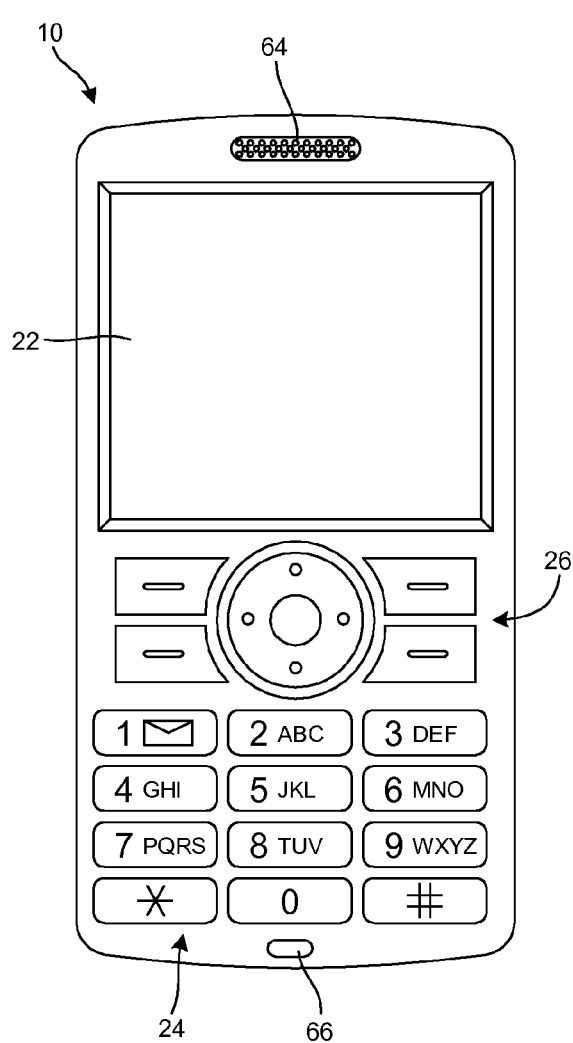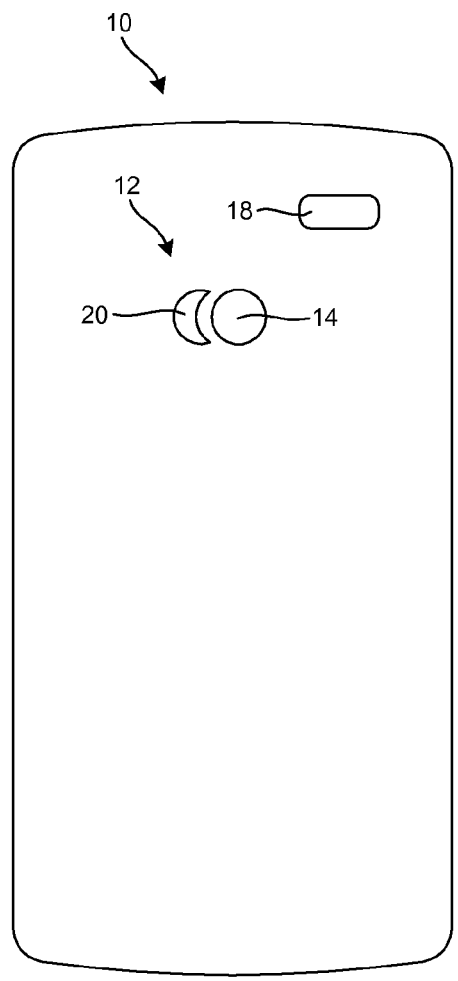
FIG. 1
FIG. 2

CAMERA SYSTEM AND METHOD FOR OPERATING A CAMERA SYSTEM

TECHNICAL FIELD OF THE INVENTION

The technology of the present disclosure relates generally to photography and, more particularly, to a system and method that monitors subjects in an image field and controls flash operation to minimize firing the flash while a subject is blinking.

BACKGROUND

Mobile and/or wireless electronic devices are becoming increasingly popular. For example, mobile telephones, portable media players and portable gaming devices are now in wide-spread use. In addition, the features associated with certain types of electronic devices have become increasingly diverse. For example, many mobile telephones now include cameras that are capable of capturing still images and video images.

In low light situations, many cameras rely on a flash to provide supplemental light to the scene to improve the image quality of a resultant photograph. But if the flash is fired and image data for the photograph is captured while a person in the image field is blinking, then the resultant representation of the subject in the photograph will appear with his or her eye shut or partially shut.

SUMMARY

To improve the manner in which a photograph is taken in low light situations, the present disclosure describes an improved blink detection and flash operation technique. The disclosed technique relies on a blink detection approach that performs well in low light situations, rather than on a blink detection approach that includes recognizing facial features. Also, the approach may be implemented in software that, when executed, consumes very little processing power. As a result, the blink activity of a relatively large number of subjects (e.g., about a dozen or more subjects) may be tracked with ease.

According to one aspect of the disclosure, a method of controlling a camera assembly includes monitoring an image field for blinks by one or more subjects in the image field by generating a video signal of the image field, the video signal having a sequence of frames; subtracting a previous frame of the video signal from a current frame of the video signal to generate a difference frame; and identifying image data in the difference frame that is representative of a blink. The method may further include tracking each blink and associating each blink with a subject from the one or more subjects; generating statistical data regarding blink duration and blink rate for each subject from the one or more subjects; and in response to user input to command the taking of a photograph, determining if a blink is in progress and firing a flash of the camera assembly and capturing image data for the photograph if no blink is detected at the time of the command, else delaying the firing of the flash and the capturing of the image data by an amount of time that is based on the statistical data to minimize firing the flash and capturing the image data during a blink of the one or more subjects.

According to one embodiment of the method, a length of the delay is an average blink time of a large sample of persons minus a duration of the blink detected at the time of the command as measured from the start of the blink to the time of the command.

According to one embodiment of the method, a length of the delay is an average blink time that has been calculated for the subject associated with the blink detected at the time of the command.

According to one embodiment of the method, a length of the delay is an average blink time that has been calculated for the subject associated with the blink detected at the time of the command minus a duration of the blink as measured from the start of the blink to the time of the command.

According to one embodiment of the method, the length of the delay is determined using a predictive algorithm that takes into account the number of subjects and the statistical data.

According to one embodiment, the method further includes firing the flash and capturing the image data after the delay without determining if another blink is in progress.

According to one embodiment, the method further includes determining if another blink is in progress at a time that the delay ends.

According to one embodiment of the method, if another blink is in progress at the time that the delay ends, delaying the firing of the flash and the capturing of the image data, else firing a flash of the camera assembly and capturing image data for the photograph.

According to one embodiment, the method further includes using at least one of face detection or face recognition to track movement of each subject and using the tracked movement to aid the associating of the blanks and subjects.

According to one embodiment, the method further includes identifying a subject using face recognition and storing the statistical data for the identified subject for use during a subsequent photo session in which the identified subject appears in the image field of the camera assembly.

According to another aspect of the disclosure, a camera assembly includes a sensor that captures image data for a photograph and that generates a video signal of an image field, the video signal having a sequence of frames; a flash that provides supplemental illumination during the capture of image data for the photograph; and a controller that controls operation of the sensor and the flash. The controller may be configured to monitor the image field for blinks by one or more subjects in the image field by subtracting a previous frame of the video signal from a current frame of the video signal to generate a difference frame and identifying image data in the difference frame that is representative of a blink; track each blink and associate each blink with a subject from the one or more subjects; generate statistical data regarding blink duration and blink rate for each subject from the one or more subjects; and in response to user input to command the taking of a photograph, determine if a blink is in progress and control the flash to fire and the sensor to capture image data for the photograph if no blink is detected at the time of the command, else wait a delay duration that is based on the statistical data to minimize firing the flash and capturing the image data during a blink of the one or more subjects.

According to one embodiment of the camera assembly, the delay duration is an average blink time of a large sample of persons minus a duration of the blink detected at the time of the command as measured from the start of the blink to the time of the command.

According to one embodiment of the camera assembly, the delay duration is an average blink time that has been calculated for the subject associated with the blink detected at the time of the command.

According to one embodiment of the camera assembly, the delay duration is an average blink time that has been calculated for the subject associated with the blink detected at the time of the commend minus a duration of the blink as measured from the start of the blink to the time of the command.

According to one embodiment of the camera assembly, the delay duration is determined using a predictive algorithm that takes into account the number of subjects and the statistical data.

According to one embodiment of the camera assembly, the controller controls the flash to fire and the sensor to capture the image data for the photograph after the delay without determining if another blink is in progress.

According to one embodiment of the camera assembly, the controller determines if another blink is in progress at a time that the delay ends.

According to one embodiment of the camera assembly, if another blink is in progress at the time that the delay ends, the controller delays the firing of the flash and the capturing of the image data, else the controller controls the flash to fire and the sensor to capture the image data for the photograph.

According to one embodiment of the camera assembly, the controller uses at least one of face detection or face recognition to track movement of each subject and uses the tracked movement to aid the associating of the blanks and subjects.

According to one embodiment of the camera assembly, the controller identifies a subject using face recognition and stores the statistical data for the identified subject in a memory for use during a subsequent photo session in which the identified subject appears in the image field of the camera assembly.

According to one embodiment of the camera assembly, the camera assembly is part of a mobile telephone that establishes a call over a network.

These and further features will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the scope of the claims appended hereto.

Features that are described and/or illustrated with respect to one embodiment may be used in the same way or in a similar way in one or more other embodiments and/or in combination with or instead of the features of the other embodiments.

The terms "comprises" and "comprising," when used in this specification, are taken to specify the presence of stated features, integers, steps or components but do not preclude the presence or addition of one or more other features, integers, steps, components or groups thereof.

BRIEF DESCRIPTION OF THE DRAWINGS

FIGS. 1 and 2 are respectively a front view and a rear view of an exemplary electronic device that includes a representative camera assembly;

DETAILED DESCRIPTION OF EMBODIMENTS

Figure 3:
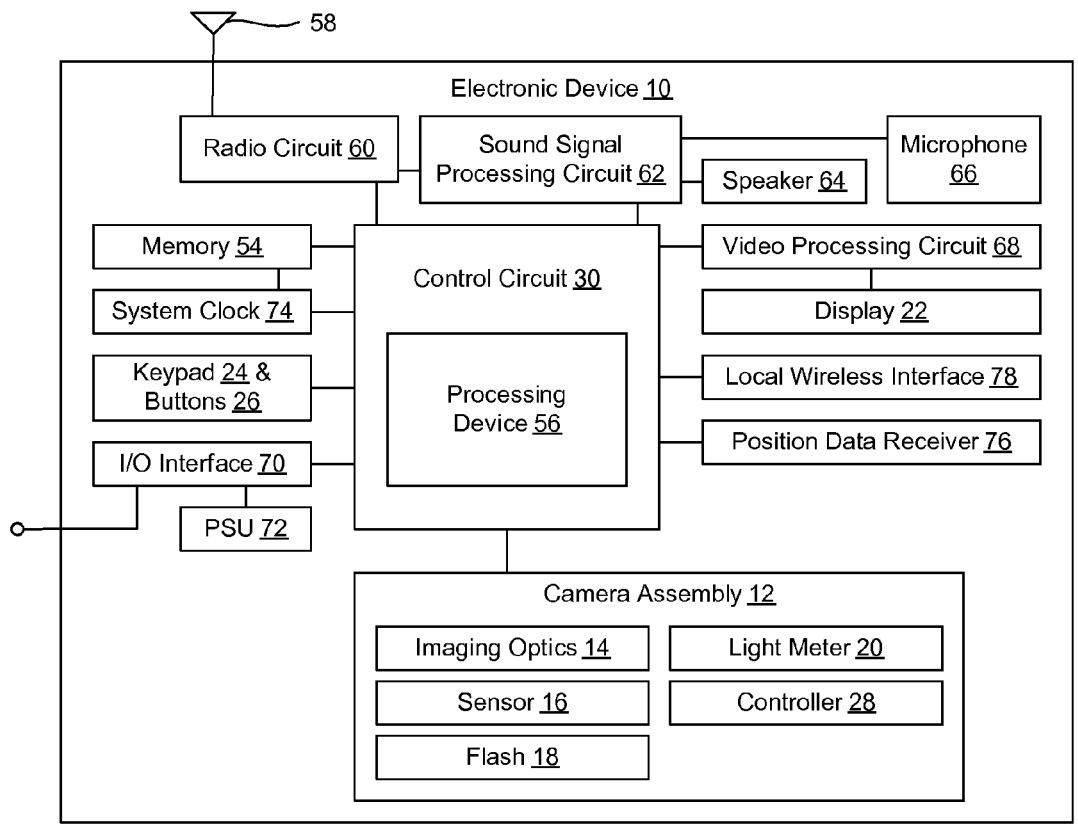
FIG. 3 is a schematic block diagram of the electronic device of FIGS. 1 and 2.

Embodiments will now be described with reference to the drawings, wherein like reference numerals are used to refer to like elements throughout. It will be understood that the figures are not necessarily to scale.

Described below in conjunction with the appended figures are various embodiments of an improved camera system and method of camera operation. In the illustrated embodiments, the camera system is embodied as a digital camera assembly that is made part of a mobile telephone. It will be appreciated that the techniques for operating a camera system may be applied to other operational contexts such as, but not limited to, a dedicated camera or another type of electronic device that has a camera (e.g., a personal digital assistant (PDA), a media player, a gaming device, a "web" camera, a computer, etc.). The camera assembly may be used to capture image data in the form of still images, also referred to as photographs, but it will be understood that the camera assembly may be capable of capturing video images in addition to still images.

Referring initially to FIGS. 1 and 2, an electronic device 10 is shown. The illustrated electronic device 10 is a mobile telephone. The electronic device 10 includes a camera assembly 12 for taking digital still pictures and/or digital video clips. It is emphasized that the electronic device 10 need not be a mobile telephone, but could be a dedicated camera or some other device as indicated above With additional reference to FIG. 3, the camera assembly 12 may be arranged as a typical camera assembly that includes imaging optics 14 to focus light from a scene within the field of view of the camera assembly 12 onto a sensor 16. The sensor 16 converts the incident light into image data. The imaging optics 14 may include a lens assembly and components that that supplement the lens assembly, such as a protective window, a filter, a prism, a mirror, focusing mechanics, focusing control electronics (e.g., a multi-zone autofocus assembly), and optical zooming mechanics. Other camera assembly 12 components may include a flash 18, a light meter 20, a display 22 for functioning as an electronic viewfinder and as part of an interactive user interface, a keypad 24 and/or buttons 26 for accepting user inputs, an optical viewfinder (not shown), and any other components commonly associated with cameras. One of the buttons 26 may be a shutter key that the user may depress to command the taking of a photograph.

The flash 18 may act as a supplemental light source during the capture of image data for a photograph. It will be understood that the sensor 16 may capture data at a predetermined frame rate to generate a preview video signal that is supplied to the display 22 for operation as an electronic viewfinder. As will be described, this video signal may be analyzed to detect blinks of subjects within a field of view of the camera assembly 12, also referred to as the image field.

Another component of the camera assembly 12 may be an electronic controller 28 that controls operation of the camera assembly 12. The controller may be embodied, for example, as a processor that executes logical instructions that are stored by an associated memory, as firmware, as an arrangement of dedicated circuit components or as a combination of these embodiments. Thus, the method of operating the camera assembly 12 may be physically embodied as executable code (e.g., software) that is stored on a machine readable medium or may be physically embodied as part of an electrical circuit. In another embodiment, the functions of the electronic controller 28 may be carried out by a control circuit 30 that is responsible for overall operation of the electronic device 10. In this case, the controller 28 may be omitted. In another embodiment, camera assembly 12 control functions may be distributed between the controller 28 and the control circuit 30.

Figure 5:
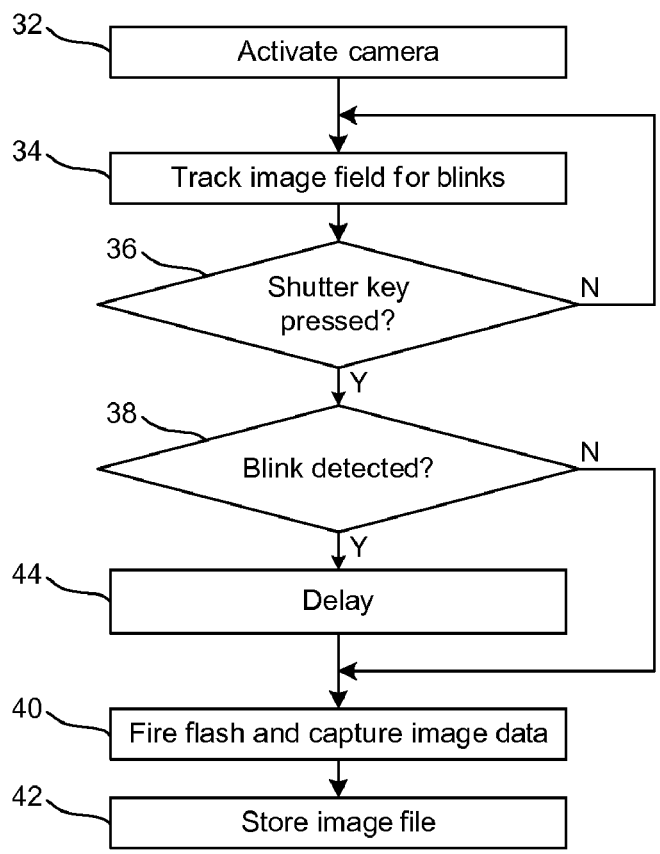
FIG. 5 is a flow diagram of an exemplary technique for blink detection and flash operation.

With additional reference to FIG. 5, illustrated is a flow diagram of an exemplary method of operating a camera assembly 12 to detect the blinks of subjects in the image field and to control the firing of a flash in accordance with any detected blinks. Variations to the illustrated methods are possible and, therefore, the illustrated embodiments should not be considered the only manners of carrying out the techniques that are disclosed in this document.

The logical flow may begin in block 32 where the camera assembly 12 is activated. Activation of the camera assembly 12 may commence operation of the sensor 16. For instance, the sensor 16 may convert light that is incident on the sensor 16 into image data. The sensing of incident light and the output of image data may be conducted in a manner to generate a video signal that is composed of a series of image frames that are generated at a predetermined frame rate. The video signal may be used to drive the display 22, which functions as an electronic viewfinder for the user.

Next, in block 34, the image field may be tracked to detect for the presence of blinks. Detecting blinks may be carried out by subtracting the image data from a previous frame from the video signal from the image data for the current frame of the video signal. The previous frame may be the immediately prior frame from the frame sequence or a frame that is older than the immediately prior frame, such as two frames prior to the current frame to about five frames prior to the current frame. The result of the subtraction may be considered a difference frame. In most situations, little change in the image field will be detected from frame to frame. But differences between the current frame and the previous frame are detectable since any pixels that are the same (or substantially the same) in the two compared frames will have a zero value (or close to a zero value) and any pixels that changed between the two compared frames will have an image data value above a predetermined threshold.

Blinks may be detected by analyzing the image date of the difference frame. A positive determination for a blink may be made if the presence of a qualifying symmetrical difference is indicated by the difference frame. A symmetrical difference may be image data in the difference frame that represents a first object and a closely spaced second object that is approximately a mirror image of the first object. For instance, a positive determination for a blink may be made if a pair of oval forms is present and the oval forms are spaced apart from one another within a predetermined horizontal distance and within a predetermined vertical offset tolerance. An oval form may be any feature that is egg-shaped, ellipsoidal, or elliptical. In another embodiment, the processing may search for round forms in addition to or instead of oval forms. The predetermined horizontal distance may be adjusted based on a zoom setting of the camera assembly 12 and/or an autofocus setting that is based on a distance between the camera assembly 12 and objects in the image field. Just as the image data from the difference frame may indicate the commencement of a blink, the image data from the difference frame may indicate the end of a blink.

The monitoring may be made on an ongoing basis, such as by generating a difference frame for every new frame of the video signal, generating a difference frame for every other frame, or generating a difference frame for some other increment number of frames (e.g., every third frame or every fifth frame). Using tracked information, the onset of a blink (e.g., a subject's eyes starting to close) may be detected and the conclusion of a blink (e.g., a reopening of the subject's eyes) may be detected. In this manner, it may be know whether a subject is blinking at any given moment in time.

Information regarding each detected blink may be tracked, including the location of blinks in the image frame, the duration of blinks (e.g., the time between the start of a blink and the end of a blink), and the time between blinks in the same approximate location of the image frame. Blinks that are detected in same approximate location of the image frame may be attributed to the same person (also referred to as a subject). For instance, if a blink is detected with a relationship to particular coordinates of the image data, then any subsequent blinks that are within a predetermined distance of those coordinates may be attributed to the same subject. As an example, if blinks are detected with proximity to three coordinate locations, then a determination that three subjects are present in the image frame. These subjects may be referred to as subject X, subject Y and subject Z. It will be appreciated that for any given image frame, there may be more or less than three subjects.

The duration of each blink for each subject may be tracked and the time between blinks for each subject may be tracked. Based on this information, statistics may be derived for each subject. For instance, an average blink time for each subject may be calculated and an average time between blinks for each subject (also referred to as a blink rate or a blink frequency) may be calculated. While research shows that the average duration of a blink for humans is about 250 milliseconds (ms) and the average number of blinks by a person is about ten per minute, these values may vary for any particular individual. In the example, analysis of the video signal from the sensor 16 may indicate that subject X has an average blink duration of about 100 ms with an average time between blinks of 5 seconds. Subject Y may be found to have an average blink duration of about 245 ms with an average time between blinks of about 10 seconds. Subject Z may be found to have an average blink duration of about 300 ms with an average time between blinks of about 7 seconds.

In one embodiment, movement of the camera assembly 12 and/or the subjects in the image field may be tracked so that blinking associated with each subject continues to be associated with each subject even if the eyes of the subject change location in the image frame. Therefore, even if the subject moves or changes the angle of his or her head with respect to the camera assembly 12, blinks may continue to be attributed to the subject. In one embodiment, this type of tracking may be implemented by combining the blink detection techniques described above with a face detection and/or face recognition algorithm that monitors the image field for individual subjects and movement of the subjects. The blinks of the subjects then may be tracked even if only one eye is visible to the camera assembly 12 or if the subject is temporarily blocked from the view of the camera assembly 12 for a short period of time (e.g., such as if the subject moves behind another person).

If face recognition is used, then the statistical information for identified individuals may be stored. The stored data then may be reused and updated during subsequent photo sessions. Also, the stored data may be associated with lighting conditions that were sensed at the time that the data was collected. If a subsequent photo session involves an individual for which data has been stored under similar lighting conditions, then the stored blink data for lighting conditions that are similar to the lighting conditions of the current photo session may be reused and updated. In addition to lighting conditions, the stored data may be associated with time of day and blink data associated with a similar time of day and lighting conditions may be reused and updated for subsequent photo sessions.

The longer the tracking of block 34 occurs, the more data regarding the subjects may be obtained. Therefore, a large amount of blink data may be gathered when the user is attempting to take one or photographs of a group of people who are posing for the photograph(s), whereas relatively little blink data may be generated when the user quickly takes a candid photograph of a person or when the subject(s) is intentionally refraining from blinking.

In block 36, a determination is made as to whether the user has commanded the taking of a photograph, such as by depressing a shutter key. If the taking of a photograph has not been commanded, the logical flow may continue to collect blink information as described in connection with block 34.

If a positive determination is made in block 36, the logical flow may proceed to block 38. In block 38, a determination is made as to whether one or more of the subjects is currently blinking. If none of the subjects are currently blinking, then the logical flow may proceed to block 40. In block 40, the camera assembly 12 may be readied to capture a photograph. For instance, among other possible changes, the sensitivity of the sensor 16 may be changed from a sensitivity used for video capture to a sensitivity for still image data capture. Also, the flash 18 may be triggered to emit a burst of light. During the burst of light, the sensor 16 may capture image data for the photograph. Thereafter, in block 42, an image file may be stored where the image file contains a photograph of a portion of a scene that falls within the field of view of the camera assembly 12. More precisely, the image file contains image data that represents the image field at the moment that the image data was captured. In most embodiments, the image data stored by the image file will be a down-sampled and/or compressed version of the image data that is output by the sensor 16.

If a blink is detected in block 38, the logical flow may proceed to block 44. In block 44, the process may be delayed a period of time to reduce the probability that one or more of the subjects will be blinking at the time that the flash 18 is fired and the sensor 16 captures image data for the photograph. In one embodiment, the delay may be the average blink time of a large sample of persons, such as the above-mentioned 250 ms. In another embodiment, the delay may be the average blink time of a large sample of persons minus the logged duration of the subject's current blink measured from the start of the blink to the time that the shutter key was pressed. This difference may serve as a reasonable approximation of the time remaining before the subject's blink ends. In another embodiment, the delay may be a predetermined amount of time, such as about 100 ms, about 150 ms, about 200 ms or some other length of time.

In another embodiment, the delay may be the average blink time that has been calculated for the subject that is blinking. If not enough data has been collected to calculate an accurate average blink time for this subject, then a default blink time may be used (e.g., about 250 ms). In another embodiment, the delay may be the average blink time of the subject minus the logged duration of the subject's current blink measured from the start of the blink to the time that the shutter key was pressed. This difference may serve as a reasonable approximation of the time remaining before the subject's blink ends. If not enough data has been collected to calculate an accurate average blink time for this subject, then a default blink time may be used (e.g., about 250 ms) in this calculation.

In another embodiment, the delay may be calculated using a predictive algorithm that takes into account the number of subjects, the data collected regarding the blink behavior of the subjects and/or default blink data (e.g., the above-mentioned 250 ms average blink duration and the 10 blink per minute average blink rate). In this manner, the delay may be established to both provide time for the eyes of the subject who triggered a positive determination in block 36 to open and to avoid potential blinks by other individuals. For instance, if collected data indicates that another subject is about to blink, then firing of the flash and capturing of the image data may be delayed to account for this possibility.

Following the delay of block 44, the logical flow may proceed to block 40 where the camera assembly 12 may be readied for taking a photograph, the flash 18 may be fired and the sensor 16 may capture image data for the photograph. In a variation to the illustrated method, following block 44, the logical flow may return to block 38 to determine if another blink has been detected.

Figure 6:
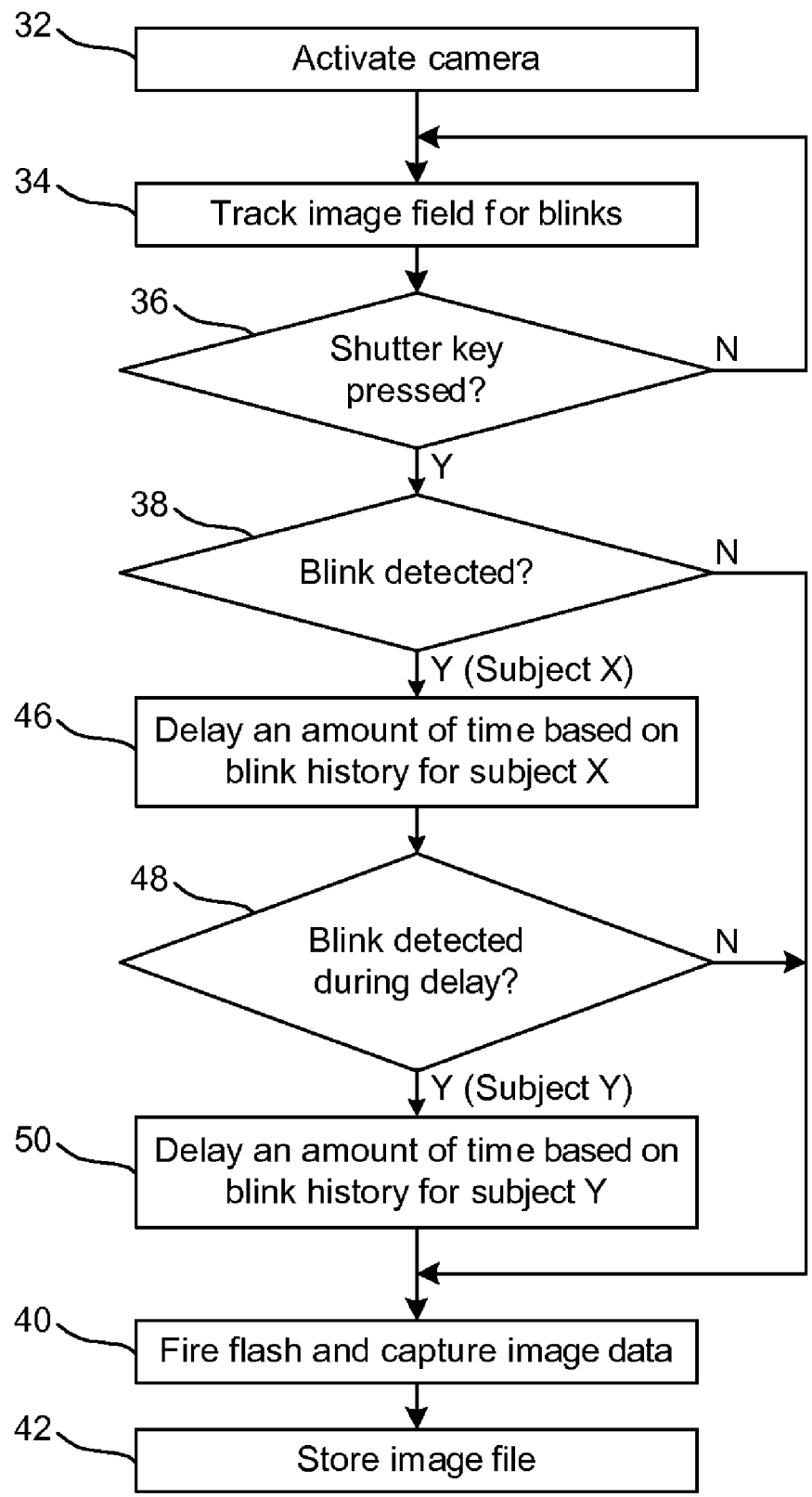
FIG. 6 is a flow diagram of another exemplary technique for blink detection and flash operation.

With additional reference to FIG. 6, illustrated is a flow diagram of another exemplary method of operating a camera assembly 12 to detect the blinks of subjects in the image field and control the firing of a flash in accordance with any detected blinks. Logical blocks that are the same as or similar to corresponding blocks of FIG. 5 will be given the same reference numbers. Also, the operation of the commonly numbered blocks will not be described in detail in connection with FIG. 6 for the sake of brevity. The logical flow may begin in block 32 by activating the camera assembly 12 and starting the capture of the video signal. Then, in block 34, blinks may be detected and data regarding the blinks may be collected as described in greater detail above.

In block 36, a determination is made as to whether the user has commanded the taking of a photograph, such as by depressing a shutter key. If the taking of a photograph has not been commanded, the logical flow may continue to collect blink information as described in connection with block 34.

If a positive determination is made in block 36, the logical flow may proceed to block 38. In block 38, a determination is made as to whether one or more of the subjects is currently blinking. If none of the subjects are currently blinking, then the logical flow may proceed to block 40. In block 40, the camera assembly 12 may be readied for taking a photograph, the flash 18 may be fired and the sensor 16 may capture image data for the photograph. Thereafter, in block 42, an image file may be stored where the image file contains a photograph of a portion of a scene that falls within the field of view of the camera assembly 12.

If a positive determination is made in block 38, the logical flow may proceed to block 46. For purposes of the description, it will be assumed that there are more than two subjects in the image field and that the subject that blinked to result in a positive determination in block 38 is subject X. It will be recognized that there may be a different number of subjects in the image field and/or a subject other that subject X may have blinked to result in the positive determination of block 38.

In block 46, the process may be delayed a period of time to reduce the probability that one or more of the subjects will be blinking at the time that the flash 18 is fired and the sensor 16 captures image data for the photograph. In one embodiment, the delay may be based on the blink history for the subject who blinked (e.g., subject X in the example). For instance, the delay may be the average blink time that has been calculated for the subject that blinked. In another embodiment, the delay may be the average blink time of the subject minus the logged duration of the subject's current blink measured from the start of the blink to the time that the shutter key was pressed. This difference may be a reasonable approximation of the time remaining before the subject's blink ends. Other delay approaches may be possible. For instance, the delay may be the average blink time of a large sample of persons, such as the above-mentioned 250 ms. In another embodiment, the delay may be a predetermined amount of time, such as about 100 ms, about 150 ms, about 200 ms or some other length of time. In another embodiment, the delay may be the average blink time of a large sample of persons minus the logged duration of the subject's current blink measured from the start of the blink to the time that the shutter key was pressed. This difference may serve as a reasonable approximation of the time remaining before the subject's blink ends. In still another embodiment, the delay may be calculated using a predictive algorithm as described in greater detail above.

After the delay of block 46, the logical flow may proceed to block 48. In block 48, a determination is made as to whether one or more of the subjects started to blink during the delay of block 46. If none of the subjects blinked, then the logical flow may proceed to block 40 and, thereafter, block 42 as described above.

If a positive determination is made in block 48, the logical flow may proceed to block 50. For purposes of the description, it will be assumed that the subject that blinked to result in a positive determination in block 48 is subject Y. It will be recognized that a subject other that subject Y may have blinked to result in the positive determination of block 48.

In block 50, the process may be delayed a period of time to reduce the probability that one or more of the subjects will be blinking at the time that the flash 18 is fired and the sensor 16 captures image data for the photograph. In one embodiment, the delay may be based on the blink history for the subject who blinked (e.g., subject Y in the example). For instance, the delay may be the average blink time that has been calculated for the subject that blinked. In another embodiment, the delay may be the average blink time of the subject minus the logged duration of the subject's current blink measured from the start of the blink to the time that the shutter key was pressed. This difference may be a reasonable approximation of the time remaining before the subject's blink ends. Other delay approaches may be possible. For instance, the delay may be the average blink time of a large sample of persons, such as the above-mentioned 250 ms. In another embodiment, the delay may be a predetermined amount of time, such as about 100 ms, about 150 ms, about 200 ms or some other length of time. In another embodiment, the delay may be the average blink time of a large sample of persons minus the logged duration of the subject's current blink measured from the start of the blink to the time that the shutter key was pressed. This difference may serve as a reasonable approximation of the time remaining before the subject's blink ends. In still another embodiment, the delay may be calculated using a predictive algorithm as described in greater detail above.

Following the delay of block 50, the logical flow may proceed to block 40 where the camera assembly 12 may be readied for taking a photograph, the flash 18 may be fired and the sensor 16 may capture image data for the photograph. In a variation to the illustrated method, following block 50, the logical flow may return to one or block 38 or block 48 to determine if another blink has been detected.

Figure 7:
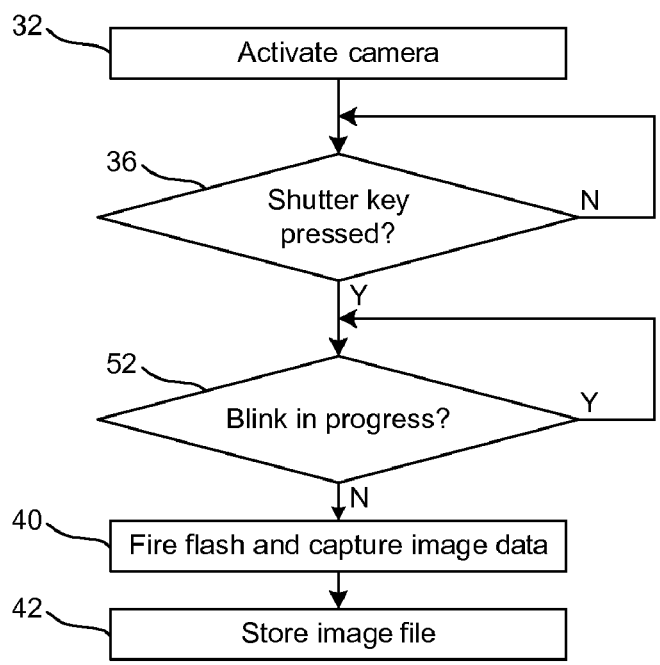
FIG. 7 is a flow diagram of another exemplary technique for blink detection and flash operation.

With additional reference to FIG. 7, illustrated is a flow diagram of another exemplary method of operating a camera assembly 12 to detect the blinks of subjects in the image field and control the firing of a flash in accordance with any detected blinks. Logical blocks that are the same as or similar to corresponding blocks of FIG. 5 and/or FIG. 6 will be given the same reference numbers. Also, the operation of the commonly numbered blocks will not be described in detail in connection with FIG. 7 for the sake of brevity. In the method depicted by FIG. 7, the camera assembly 12 need not collect statistical data regarding the blinks of subjects in the image field.

The logical flow may begin in block 32 by activating the camera assembly 12 and starting the capture of the video signal. Then, in block 34, a determination is made as to whether the user has commanded the taking of a photograph, such as by depressing a shutter key. If the taking of a photograph has not been commanded, the logical flow may wait for a positive determination in block 36.

If a positive determination is made in block 36, the logical flow may proceed to block 52. In block 52, a determination is made as to whether one or more of the subjects is currently blinking. It is noted that the video signal may be continually monitored between the activation of block 32 and the positive determination of block 36 so that, at any given time, a positive or negative determination for block 52 may be made. If a positive determination is made in block 52, the logical flow may wait until a negative determination is made. If a negative determination is made in block 52, the logical flow may proceed to block 40. In block 40, the camera assembly 12 may be readied for taking a photograph, the flash 18 may be fired and the sensor 16 may capture image data for the photograph. Thereafter, in block 42, an image file may be stored where the image file contains a photograph of a portion of a scene that falls within the field of view of the camera assembly 12.

The disclosed system and method for tracking blinks in an image field and controlling the camera assembly 12 may result in reducing the probability that a photograph is taken while a subject is blinking. The disclosed techniques may work in low light situations where use of a flash would be recommended as a supplemental light source for the capturing of image data for the photograph. In implementation, the tracking of blinks may be accomplished without the use of supplemental light source, such as a light source that illuminates for determining autofocus settings and/or sensor settings. Also, the disclosed approach is not very processor intensive. That is, the disclosed approach may be used for a relatively small number of people in the image field (e.g., one or more persons) or a relatively large number of people in the image field (e.g., about twelve or more persons) without consuming a large amount of processing capacity.

In addition, the disclosed techniques may reduce the burden on the flash. For instance, it is typical to take multiple photographs of a group of people when the user believes that one or more of the subjects was blinking. But the flash 18 may take some time to refresh. If the flash 18 is controlled to fire when the likelihood of a blink is small, then fewer flash photographs may be needed.

While the disclosed techniques may be used for any situation in which the camera assembly 12 is used to take photographs, it is possible that the greatest benefit will be attained in situations where the subject or subjects are posing for a photograph. Posing may occur, for example, when taking a photograph of a group of people who are looking at the camera assembly 12 and expecting to have their picture taken and/or when a self timer is used so that the user of the camera assembly 12 also may be present in the image field.

As indicated, the illustrated electronic device 10 shown in FIGS. 1 and 2 is a mobile telephone. Features of the electronic device 10, when implemented as a mobile telephone, will be described with additional reference to FIG. 3. The electronic device 10 is shown as having a "brick" or "block" form factor housing, but it will be appreciated that other housing types may be utilized, such as a "flip-open" form factor (e.g., a "clamshell" housing) or a slide-type form factor (e.g., a "slider" housing).

As indicated, the electronic device 10 may include the display 22. The display 22 displays information to a user such as operating state, time, telephone numbers, contact information, various menus, etc., that enable the user to utilize the various features of the electronic device 10. The display 22 also may be used to visually display content received by the electronic device 10 and/or retrieved from a memory 54 of the electronic device 10. The display 22 may be used to present images, video and other graphics to the user, such as photographs, mobile television content and video associated with games.

The keypad 24 and/or buttons 26 may provide for a variety of user input operations. For example, the keypad 24 may include alphanumeric keys for allowing entry of alphanumeric information such as telephone numbers, phone lists, contact information, notes, text, etc. In addition, the keypad 24 and/or buttons 26 may include special function keys such as a "call send" key for initiating or answering a call, and a "call end" key for ending or "hanging up" a call. Special function keys also may include menu navigation and select keys to facilitate navigating through a menu displayed on the display 22. For instance, a pointing device and/or navigation keys may be present to accept directional inputs from a user. Special function keys may include audiovisual content playback keys to start, stop and pause playback, skip or repeat tracks, and so forth. Other keys associated with the mobile telephone may include a volume key, an audio mute key, an on/off power key, a web browser launch key, etc. Keys or key-like functionality also may be embodied as a touch screen associated with the display 22. Also, the display 22 and keypad 24 and/or buttons 26 may be used in conjunction with one another to implement soft key functionality. As such, the display 22, the keypad 24 and/or the buttons 26 may be used to control the camera assembly 12.

The electronic device 10 may include call circuitry that enables the electronic device 10 to establish a call and/or exchange signals with a called/calling device, which typically may be another mobile telephone or landline telephone. However, the called/calling device need not be another telephone, but may be some other device such as an Internet web server, content providing server, etc. Calls may take any suitable form. For example, the call could be a conventional call that is established over a cellular circuit-switched network or a voice over Internet Protocol (VoIP) call that is established over a packet-switched capability of a cellular network or over an alternative packet-switched network, such as WiFi (e.g., a network based on the IEEE 802.11 standard), WiMax (e.g., a network based on the IEEE 802.16 standard), etc. Another example includes a video enabled call that is established over a cellular or alternative network.

The electronic device 10 may be configured to transmit, receive and/or process data, such as text messages, instant messages, electronic mail messages, multimedia messages, image files, video files, audio files, ring tones, signaling audio, signaling video, data feeds (including podcasts and really simple syndication (RSS) data feeds), and so forth. It is noted that a text message is commonly referred to by some as "an SMS," which stands for simple message service. SMS is a typical standard for exchanging text messages. Similarly, a multimedia message is commonly referred to by some as "an MMS," which stands for multimedia message service. MMS is a typical standard for exchanging multimedia messages. Processing data may include storing the data in the memory 54, executing applications to allow user interaction with the data, displaying video and/or image content associated with the data, outputting audio sounds associated with the data, and so forth.

The electronic device 10 may include the primary control circuit 30 that is configured to carry out overall control of the functions and operations of the electronic device 10. As indicated, the control circuit 30 may be responsible for controlling the camera assembly 12, including the quality management of photographs.

The control circuit 30 may include a processing device 56, such as a central processing unit (CPU), microcontroller or microprocessor. The processing device 56 may execute code that implements the various functions of the electronic device 10. The code may be stored in a memory (not shown) within the control circuit 30 and/or in a separate memory, such as the memory 54, in order to carry out operation of the electronic device 10. It will be apparent to a person having ordinary skill in the art of computer programming, and specifically in application programming for mobile telephones or other electronic devices, how to program a electronic device 10 to operate and carry out various logical functions.

Among other data storage responsibilities, the memory 54 may be used to store photographs and/or video clips that are captured by the camera assembly 12. Alternatively, the images may be stored in a separate memory. The memory 54 may be, for example, one or more of a buffer, a flash memory, a hard drive, a removable media, a volatile memory, a non-volatile memory, a random access memory (RAM), or other suitable device. In a typical arrangement, the memory 54 may include a non-volatile memory (e.g., a NAND or NOR architecture flash memory) for long term data storage and a volatile memory that functions as system memory for the control circuit 30. The volatile memory may be a RAM implemented with synchronous dynamic random access memory (SDRAM), for example. The memory 54 may exchange data with the control circuit 30 over a data bus. Accompanying control lines and an address bus between the memory 54 and the control circuit 30 also may be present.

Continuing to refer to FIGS. 1 through 3, the electronic device 10 includes an antenna 58 coupled to a radio circuit 60. The radio circuit 60 includes a radio frequency transmitter and receiver for transmitting and receiving signals via the antenna 58. The radio circuit 60 may be configured to operate in a mobile communications system and may be used to send and receive data and/or audiovisual content. Receiver types for interaction with a mobile radio network and/or broadcasting network include, but are not limited to, global system for mobile communications (GSM), code division multiple access (CDMA), wideband CDMA (WCDMA), general packet radio service (GPRS), WiFi, WiMax, digital video broadcasting-handheld (DVB-H), integrated services digital broadcasting (ISDB), etc., as well as advanced versions of these standards. It will be appreciated that the antenna 58 and the radio circuit 60 may represent one or more than one radio transceivers.

The electronic device 10 further includes a sound signal processing circuit 62 for processing audio signals transmitted by and received from the radio circuit 60. Coupled to the sound processing circuit 62 are a speaker 64 and a microphone 66 that enable a user to listen and speak via the electronic device 10 as is conventional. The radio circuit 60 and sound processing circuit 62 are each coupled to the control circuit 30 so as to carry out overall operation. Audio data may be passed from the control circuit 30 to the sound signal processing circuit 62 for playback to the user. The audio data may include, for example, audio data from an audio file stored by the memory 54 and retrieved by the control circuit 30, or received audio data such as in the form of signaling audio data from a mobile radio service. The sound processing circuit 62 may include any appropriate buffers, decoders, amplifiers and so forth.

The display 22 may be coupled to the control circuit 30 by a video processing circuit 68 that converts video data to a video signal used to drive the display 22. The video processing circuit 68 may include any appropriate buffers, decoders, video data processors and so forth. The video data may be generated by the control circuit 30, retrieved from a video file that is stored in the memory 54, derived from an incoming video data signal that is received by the radio circuit 60 or obtained by any other suitable method. Also, the video data may be generated by the camera assembly 12 (e.g., such as a preview video signal to provide a viewfinder function for the camera assembly 12).

The electronic device 10 may further include one or more I/O interface(s) 70. The I/O interface(s) 70 may be in the form of typical mobile telephone I/O interfaces and may include one or more electrical connectors. As is typical, the I/O interface(s) 70 may be used to couple the electronic device 10 to a battery charger to charge a battery of a power supply unit (PSU) 72 within the electronic device 10. In addition, or in the alternative, the I/O interface(s) 70 may serve to connect the electronic device 10 to a headset assembly (e.g., a personal handsfree (PHF) device) that has a wired interface with the electronic device 10. Further, the I/O interface(s) 70 may serve to connect the electronic device 10 to a personal computer or other device via a data cable for the exchange of data. The electronic device 10 may receive operating power via the I/O interface(s) 70 when connected to a vehicle power adapter or an electricity outlet power adapter. The PSU 72 may supply power to operate the electronic device 10 in the absence of an external power source.

The electronic device 10 also may include a system clock 74 for clocking the various components of the electronic device 10, such as the control circuit 30 and the memory 54.

The electronic device 10 also may include a position data receiver 76, such as a global positioning system (GPS) receiver, Galileo satellite system receiver or the like.

The position data receiver 76 may be involved in determining the location of the electronic device 10.

The electronic device 10 also may include a local wireless interface 78, such as an infrared transceiver and/or an RF interface (e.g., a Bluetooth interface), for establishing communication with an accessory, another mobile radio terminal, a computer or another device. For example, the local wireless interface 78 may operatively couple the electronic device 10 to a headset assembly (e.g., a PHF device) in an embodiment where the headset assembly has a corresponding wireless interface.

Figure 4:
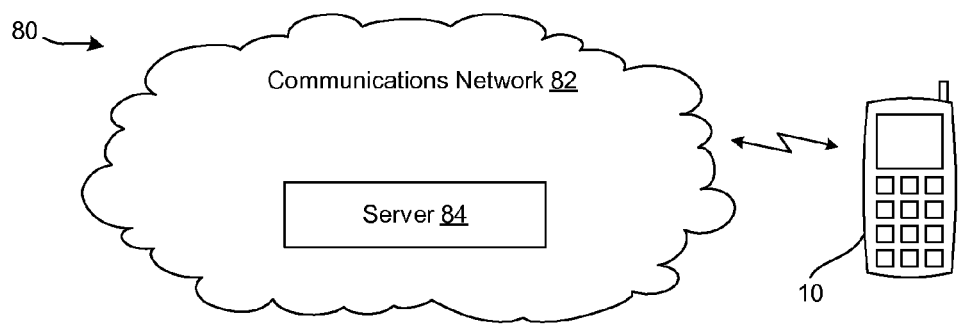
FIG. 4 is a schematic diagram of a communications system in which the electronic device of FIGS. 1 and 2 may operate.

With additional reference to FIG. 4, the electronic device 10 may be configured to operate as part of a communications system 80. The system 80 may include a communications network 82 having a server 84 (or servers) for managing calls placed by and destined to the electronic device 10, transmitting data to the electronic device 10 and carrying out any other support functions. The server 84 communicates with the electronic device 10 via a transmission medium. The transmission medium may be any appropriate device or assembly, including, for example, a communications tower (e.g., a cell tower), another mobile telephone, a wireless access point, a satellite, etc. Portions of the network may include wireless transmission pathways. The network 82 may support the communications activity of multiple electronic devices 10 and other types of end user devices. As will be appreciated, the server 84 may be configured as a typical computer system used to carry out server functions and may include a processor configured to execute software containing logical instructions that embody the functions of the server 84 and a memory to store such software.

Although certain embodiments have been shown and described, it is understood that equivalents and modifications falling within the scope of the appended claims will occur to others who are skilled in the art upon the reading and understanding of this specification.

What is claimed is:

1. A method of controlling a camera assembly, comprising:
 monitoring an image field for blinks by one or more subjects in the image field by:
   generating a video signal of the image field, the video signal having a sequence of frames;
   subtracting a previous frame of the video signal from a current frame of the video signal to generate a difference frame; and
   identifying image data in the difference frame that is representative of a blink;
 tracking each blink and associating each blink with a subject from the one or more subjects;
 generating statistical data regarding blink duration and blink rate for each subject from the one or more subjects; and
 in response to user input to command the taking of a photograph, determining if a blink is in progress and firing a flash of the camera assembly and capturing image data for the photograph if no blink is detected at the time of the command, else delaying the firing of the flash and the capturing of the image data by an amount of time that is based on the statistical data to minimize firing the flash and capturing the image data during a blink of the one or more subjects; and
 wherein a length of the delay is an average blink time of a large sample of persons minus a duration of the blink detected at the time of the command as measured from the start of the blink to the time of the command.

2. The method of claim 1, further comprising firing the flash and capturing the image data after the delay without determining if another blink is in progress.

3. The method of claim 1, further comprising determining if another blink is in progress at a time that the delay ends and wherein if another blink is in progress at the time that the delay ends, delaying the firing of the flash and the capturing of the image data, else firing a flash of the camera assembly and capturing image data for the photograph.

4. The method of claim 1, further comprising using at least one of face detection or face recognition to track movement of each subject and using the tracked movement to aid the associating of the blinks and subjects.

5. The method of claim 1, further comprising identifying a subject using face recognition and storing the statistical data for the identified subject for use during a subsequent photo session in which the identified subject appears in the image field of the camera assembly.

6. A method of controlling a camera assembly, comprising:
 monitoring an image field for blinks by one or more subjects in the image field by:
   generating a video signal of the image field, the video signal having a sequence of frames;
   subtracting a previous frame of the video signal from a current frame of the video signal to generate a difference frame; and
   identifying image data in the difference frame that is representative of a blink;
 tracking each blink and associating each blink with a subject from the one or more subjects;

generating statistical data regarding blink duration and blink rate for each subject from the one or more subjects; and in response to user input to command the taking of a photograph, determining if a blink is in progress and firing a flash of the camera assembly and capturing image data for the photograph if no blink is detected at the time of the command, else delaying the firing of the flash and the capturing of the image data by an amount of time that is based on the statistical data to minimize firing the flash and capturing the image data during a blink of the one or more subjects; and wherein a length of the delay is an average blink time that has been calculated for the subject associated with the blink detected at the time of the command minus a duration of the blink as measured from the start of the blink to the time of the command.

7. The method of claim 6, further comprising using at least one of face detection or face recognition to track movement of each subject and using the tracked movement to aid the associating of the blinks and subjects.

8. The method of claim 6, further comprising identifying a subject using face recognition and storing the statistical data for the identified subject for use during a subsequent photo session in which the identified subject appears in the image field of the camera assembly.

9. A camera assembly, comprising:
a sensor that captures image data for a photograph and that generates a video signal of an image field, the video signal having a sequence of frames;
a flash that provides supplemental illumination during the capture of image data for the photograph; and
a controller that controls operation of the sensor and the flash, the controller configured to:
monitor the image field for blinks by one or more subjects in the image field by subtracting a previous frame of the video signal from a current frame of the video signal to generate a difference frame and identifying image data in the difference frame that is representative of a blink;
track each blink and associate each blink with a subject from the one or more subjects;
generate statistical data regarding blink duration and blink rate for each subject from the one or more subjects; and
in response to user input to command the taking of a photograph, determine if a blink is in progress and control the flash to fire and the sensor to capture image data for the photograph if no blink is detected at the time of the command, else wait a delay duration that is based on the statistical data to minimize firing the flash and capturing the image data during a blink of the one or more subjects; and
wherein the delay duration is an average blink time of a large sample of persons minus a duration of the blink detected at the time of the command as measured from the start of the blink to the time of the command.

10. The camera assembly of claim 9, wherein the controller uses at least one of face detection or face recognition to track movement of each subject and uses the tracked movement to aid the associating of the blinks and subjects.

11. The camera assembly of claim 9, wherein the controller identifies a subject using face recognition and stores the statistical data for the identified subject in a memory for use during a subsequent photo session in which the identified subject appears in the image field of the camera assembly.

12. A camera assembly, comprising:
a sensor that captures image data for a photograph and that generates a video signal of an image field, the video signal having a sequence of frames;
a flash that provides supplemental illumination during the capture of image data for the photograph; and
a controller that controls operation of the sensor and the flash, the controller configured to:
monitor the image field for blinks by one or more subjects in the image field by subtracting a previous frame of the video signal from a current frame of the video signal to generate a difference frame and identifying image data in the difference frame that is representative of a blink;
track each blink and associate each blink with a subject from the one or more subjects;
generate statistical data regarding blink duration and blink rate for each subject from the one or more subjects; and
in response to user input to command the taking of a photograph, determine if a blink is in progress and control the flash to fire and the sensor to capture image data for the photograph if no blink is detected at the time of the command, else wait a delay duration that is based on the statistical data to minimize firing the flash and capturing the image data during a blink of the one or more subjects; and
wherein the delay duration is an average blink time that has been calculated for the subject associated with the blink detected at the time of the command minus a duration of the blink as measured from the start of the blink to the time of the command.

13. The camera assembly of claim 12, wherein the controller controls the flash to fire and the sensor to capture the image data for the photograph after the delay without determining if another blink is in progress.

14. The camera assembly of claim 12, wherein the controller determines if another blink is in progress at a time that the delay ends and if another blink is in progress at the time that the delay ends, the controller delays the firing of the flash and the capturing of the image data, else the controller controls the flash to fire and the sensor to capture the image data for the photograph.

15. The camera assembly of claim 12, wherein the controller uses at least one of face detection or face recognition to track movement of each subject and uses the tracked movement to aid the associating of the blinks and subjects.

16. The camera assembly of claim 12, wherein the controller identifies a subject using face recognition and stores the statistical data for the identified subject in a memory for use during a subsequent photo session in which the identified subject appears in the image field of the camera assembly.

17. The camera assembly of claim 12, wherein the camera assembly is part of a mobile telephone that establishes a call over a network.

* * * * *